United States Patent
Cornell et al.

(10) Patent No.: US 7,542,681 B2
(45) Date of Patent: Jun. 2, 2009

(54) NETWORK TAP WITH INTERFACE FOR CONNECTING TO PLUGGABLE OPTOELECTRONIC MODULE

(75) Inventors: Kevin Scott Cornell, Santa Cruz, CA (US); Mark Farley, Napa, CA (US)

(73) Assignee: Finisar Corporation, Sunnyvale, CA (US)

( * ) Notice: Subject to any disclaimer, the term of this patent is extended or adjusted under 35 U.S.C. 154(b) by 504 days.

(21) Appl. No.: 11/119,079

(22) Filed: Apr. 29, 2005

(65) Prior Publication Data

US 2006/0008210 A1 Jan. 12, 2006

Related U.S. Application Data

(60) Provisional application No. 60/583,754, filed on Jun. 29, 2004.

(51) Int. Cl.
*H04B 10/00* (2006.01)
*H04J 14/00* (2006.01)

(52) U.S. Cl. .............. 398/139; 398/135; 398/66

(58) Field of Classification Search ............ 398/135, 398/138, 139, 67, 72, 33, 59, 66; 385/48
See application file for complete search history.

(56) References Cited

U.S. PATENT DOCUMENTS

| | | | |
|---|---|---|---|
| 6,400,476 B1 * | 6/2002 | Arecco | 398/9 |
| 7,254,330 B2 * | 8/2007 | Pratt et al. | 398/67 |
| 2005/0191056 A1 * | 9/2005 | Coffey | 398/79 |
| 2005/0238358 A1 * | 10/2005 | Light | 398/135 |

* cited by examiner

*Primary Examiner*—M. R. Sedighian
(74) *Attorney, Agent, or Firm*—Workman Nydegger

(57) ABSTRACT

A network TAP that provides access to data communicated in a network. The TAP includes a first port for connecting to a pluggable optoelectronic module such as an optical transceiver, a link port for connecting to an optical link configured to receive and send data to the optical transceiver, and a TAP port for relaying diverted optical data to a storage and/or analyzing device. Couplers are used to split the optical signals entering the TAP from the first port and/or the link port such that a useable portion of the optical signal(s) can be stored and/or analyzed. The TAP also includes optical devices for relaying optical signals between components in the TAP.

8 Claims, 1 Drawing Sheet

NETWORK TAP WITH INTERFACE FOR CONNECTING TO PLUGGABLE OPTOELECTRONIC MODULE

CROSS-REFERENCE TO RELATED APPLICATIONS

This application claims the benefit of U.S. Provisional Patent Application No. 60/583,754, filed Jun. 29, 2004, which is incorporated herein by reference.

BACKGROUND OF THE INVENTION

1. The Field of the Invention

The present invention relates to the field of devices for use in optical communications. More particularly, the present invention relates to optical devices for tapping an optical fiber to divert a portion of an optical signal to a connected device such as a network analyzer.

2. The Relevant Technology

As local area networks and other networks become more pervasive and complex, the need to obtain access to network data for purposes of testing, monitoring, analysis, etc., has become more important. For instance, when a network problem is experienced, a network administrator may need to capture or otherwise monitor the network data to diagnose the problem and identify the network components or conditions that may be responsible for the condition.

One technique for accessing network data is to either break a network link (e.g., temporarily disconnecting an end of a link) so that a network monitoring or analysis device can be placed in-line in a position where the network data can be accessed. The temporary disruption of the network topology and the associated connectivity between network nodes when the link is broken represent a significant problem and, in many situations, makes this approach to network monitoring or analysis highly undesirable.

This problem can often be avoided using network Traffic Access Ports ("TAPs"), which are devices that are placed inline in a network link and split, or tap, a data signal by diverting a portion of the signal away from the network link to a TAP port where the signal can be transmitted to a network capture or analysis device. Network TAPs often have multiple ports and can be applied to multiple network links. TAPs typically are positioned in a location in the network where the network problems might be experienced. A primary benefit of network TAPs is the fact that network data can be accessed at will without breaking a network link. Regardless of whether a TAP is in use at any particular time by a network analysis device, the components at either end of the tapped network link can communicate with each other as if the TAP were not present.

Although conventional network TAPs have significantly improved the ability to access network data, such TAPs have typically been fixtures located at discrete points in a network. When the TAP is located in a position where data of interest can be accessed, the TAPs generally perform quite well. However, as the topology of a particular network grows or changes, or if the number of conventional TAPs is not sufficient, it is possible that a network problem could arise in a location that is not serviced by a tap. In such situations, the network administrator can access the appropriate network data only by breaking a network link and inserting either a TAP or a network analysis device.

One way to solve this problem is to place a TAP on every link of a network, such as a storage area network (SAN) or local area network (LAN). Despite the benefits of such a practice, this has generally not been feasible because conventional network TAPs can be prohibitively expensive or bulky. Moreover, the use of a large number of conventional TAPs can lead to the concern of inserting an undesirable number of potential points of failure into a network.

It would therefore represent an advance in the art to provide devices that overcome the foregoing difficulties.

BRIEF SUMMARY OF THE INVENTION

In order to overcome these needs, the present invention relates to Traffic Access Ports (TAPs) that plug directly into a port in a pluggable optoelectronic module such as an optical transceiver connected to a network device, such as a switch or Redundant Array of Inexpensive Disks (RAID) device. An example of such a port is a communications port that is configured according to the Small Form-factor Pluggable (SFP) Transceiver MultiSource Agreement (MSA). Such SFP ports are common in many network switch or RAID devices. The SFP ports are often used to receive pluggable transceiver modules, such as SFP optical transceivers, that propagate data signals between the port and a remote node in the network. According to the invention, the TAP can be a removable extension of an SFP optical transceiver module that plugs into an SFP port. This enables potentially every communication port or network link to have an associated TAP that provides access to network data for purposes of data capture, analysis, and monitoring.

Accordingly, a first example embodiment of the invention is a network TAP that provides access to data communicated in a network. The TAP generally includes: a transceiver port configured to be connected to an optical transceiver module; a link port configured to interface with a network link that is in communication with the optical transceiver module, wherein at least one optical path is configured to relay optical signals between the transceiver port and the link port; and a TAP port configured to relay a portion of optical signals received at the transceiver port and a portion of optical signals received at the link port to a connected device.

A second example embodiment of the invention is a removable network TAP that provides access to data communicated in a network. The TAP generally includes: a transceiver port configured to be removably connected to an optical transceiver module whereby the transceiver port can receive a first optical signal from the optical transceiver module and relay a second optical signal to the optical transceiver module; a link port configured to be removably connected to a network link whereby the link port can receive the second optical signal from the network link and relay the first optical signal to the network link; a first coupler configured to receive the first optical signal from the transceiver port and split the first optical signal such that a first portion of the first optical signal is relayed to a TAP port and a second portion of the first optical signal is relayed to the link port; and a second coupler configured to receive the second optical signal from the link port and split the second optical signal such that a first portion of the second optical signal is relayed to the TAP port and a second portion of the second optical signal is relayed to the transceiver port.

A third example embodiment of the invention is a network TAP that provides access to data communicated in a network. The TAP includes: a transceiver port configured to be connected directly to an SFP optical transceiver module, including a first transceiver interface for receiving outgoing signals from a transmitter optical subassembly of the optical transceiver module and a second transceiver interface for passing incoming signals to a receiver optical subassembly of the optical transceiver module; a link port that interfaces with a network link that is in communication with the optical transceiver module, including a first link interface for connecting to a first optical cable carrying incoming signals and a second link interface for connecting to a second optical cable carrying outgoing signals; a TAP port that is configured for relaying optical signals to a connected device; a first optical path between the first transceiver interface and the second link interface; a first coupler for splitting a portion of the optical signals transmitted on the first optical path such that the split portion of the optical signals are relayed on a third optical path to the TAP port; a second optical path between the second transceiver interface and the first link interface; and a second coupler for splitting a portion of the optical signals transmitted on the second optical path such that the split portion of the optical signals are relayed on a fourth optical path to the TAP port.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical systems have not been described in great detail in order to avoid unnecessarily obscuring the present invention.

Figure 1A:
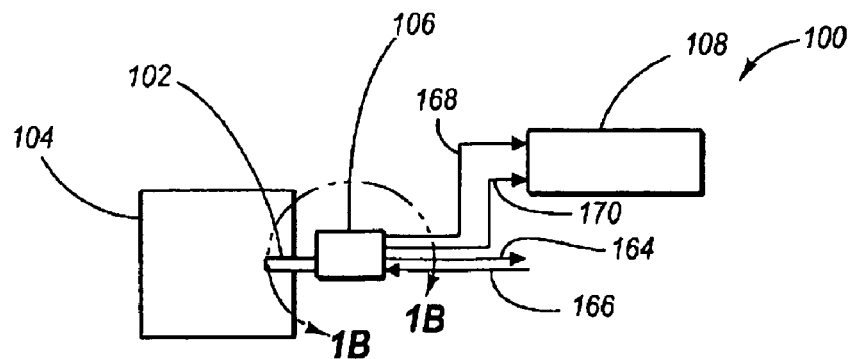
FIG. 1A illustrates a Traffic Access Port in a network environment according to a first embodiment of the invention.
Figure 1B:
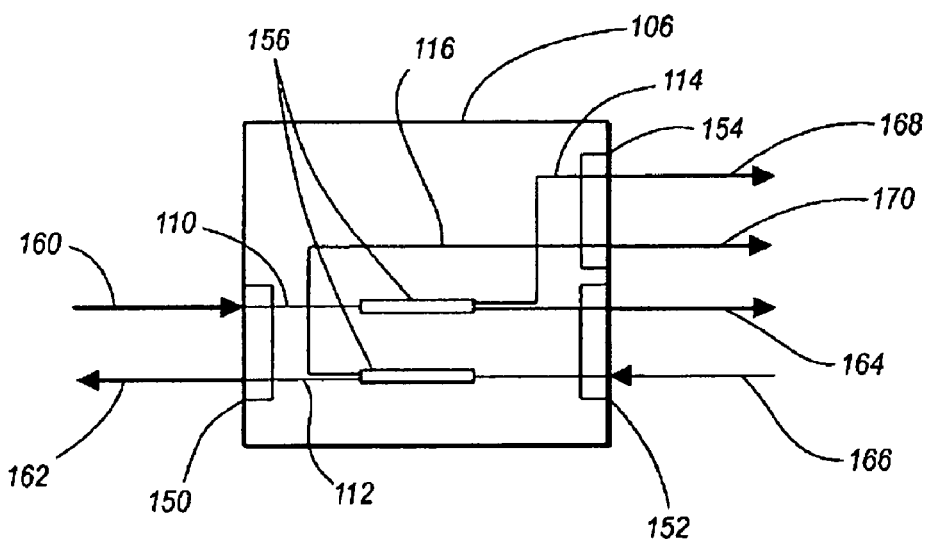
FIG. 1B illustrates further details of a Traffic Access Port according to another example embodiment of the invention.

Referring now to FIGS. 1A and 1B, FIG. 1A schematically illustrates an embodiment of a network Traffic Access Port ("TAP") 106 according to the invention in an example network environment. As illustrated, TAP 106 is connected to a pluggable optoelectronic module such as an optical transceiver module 102. The optical transceiver module is in turn connected to a port in a network device 104, such as a switch, a host bus adapter, a Redundant Array of Independent Disks (RAID), or other network device to which an optical transceiver may be connected.

The optical transceiver module 102 can be any of various types of transceiver modules that pass data bidirectionally, meaning that the module has a transmitter optical subassembly with a laser that transmits data out into the network and a receiver optical subassembly that receives data in from the network. Such a transceiver passes incoming data through a first cable connector (not illustrated) and outgoing data through a second cable connector (not illustrated). For example, a preferred transceiver module for use with the network TAPs of the invention is a conventional SFP transceiver module. An SFP module is bidirectional, having incoming and outgoing connector ports at a duplex connector. Further details regarding conventional SFP device configurations are well known in the art and can be found, for example, in the "Small Form Factor Pluggable (SFP) Transceiver MultiSource Agreement (MSA)", (Sep. 14, 2000), which is incorporated herein by reference. Other standard and future transceivers and their respective interface connectors are also well known in the art, or will be well known in the art, and are also included within the scope of the invention.

In normal operation, transceiver module 102 would transmit and receive optical signals on optical cables 164 and 166. When TAP 106 is inserted, however, optical signals are routed through TAP 106 between transceiver module 102 and optical cables 164, 166. The TAP 106 also diverts a copy of incoming and/or outgoing the optical signals onto cables 168 and 170 to a connected network device 108. Network device 108 can be, for example, a network analyzer, a mass storage device for storing captured data, or any other device where it is desired to receive the copied or split optical signal.

Referring now to FIG. 1B, the TAPs of the present invention are three port devices, including a "transceiver" port 150 that connects directly with an optical transceiver, a "link" port 152 that connects with the network link (cables 164, 166) that communicates with the transceiver, and a "tap" port 154 that connects with network device 108 that accesses the tapped network data. As used herein, the term "port" denotes a communications access point, including both male and female adapters, other connectors, and wireless components. As previously noted, one skilled in the art will recognize that the illustrations do not depict required port forms or configurations. By way of example only, in a preferred embodiment of the invention, transceiver port 150 will be an SFP duplex cable connector such that it can plug into a duplex transceiver connector on an SFP transceiver module. Similarly, link port 152 will be an SFP duplex transceiver connector such that a duplex cable connector on cables 164 and 166 can quickly and easily be attached. TAP port 154 is more flexible and can be selected to match the desired hardware for cable 168 and 170 and network device 108. The preferred embodiment of the invention wherein ports 150 and 152 replicate the cable and transceiver ports between which it will be inserted serves to make the device easy to insert and remove into a network. Alternatively, additional adapters can be used to insert TAP 106 if necessary for compatibility with the connectors on transceiver 102 and cables 164, 166.

As shown in FIG. 1B, the TAP 106 includes a pair of couplers 156, each associated with one of the directional links of the SFP module. The couplers split a portion of the data signals out of the associated links such that a network analysis device connected to the TAP can access the network data. As noted in FIGS. 1A and 1B, a network device 108 connected to the TAP 106 can obtain incoming data from the link port 150 and the transceiver port 152, thereby accessing data from both of the directional links of the transceiver. More particularly, optical link 112 passes through a coupler 156 where a portion of an optical signal is split and sent on optical link 116 to TAP port 154 and on to network device 108. Similarly, optical link 110 passes through a coupler 156 where a portion of an optical signal is split and routed on optical link 114 to TAP port 154 and on to network device 108.

The couplers 156 within the TAP 106 can have any desired split ratios. For example, the couplers 156 can provide a split ratio of 70/30, meaning that 70% of the optical power passes through a coupler 156 and remains in the network link and 30% is diverted from the TAP 106 to the network device 108. The split ratio that is used in any particular situation is determined by the light loss budget constraints of the network and the amount of power required by the network analysis device.

The TAPs shown in FIG. 1 are 1×1 TAPs, meaning that there is one TAP port for each tapped bidirectional link. The TAPs of the invention can also have other numbers of TAP ports (e.g., 1×2 or higher-order TAPs). However, 1×1 TAPs are generally preferred because of the space constraints and light loss budget constraints that often exist.

Figure 2:
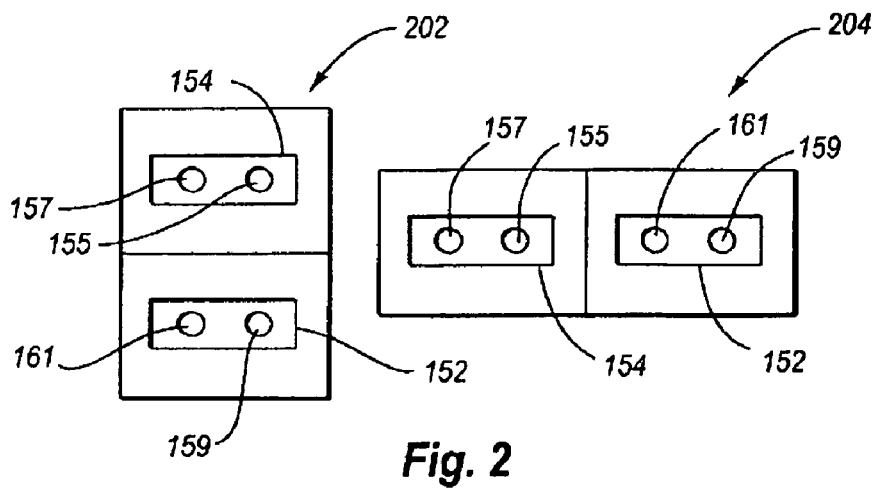
FIG. 2 illustrates configurations of a link port and a TAP port in a Traffic Access Port according to additional example embodiments of the invention.

Referring now to FIG. 2, the TAP port 154 and the link port 152 can be aligned in various configurations depending on the space constraints associated with the ports on the network device. For example, the port for the network link and the port for the network analysis device can have a horizontal configuration 204 or a vertical configuration 202 as illustrated in the alternative configurations in FIG. 2. Interfaces 155, 157, 159, and 161 are depicted to illustrate one preferred arrangement of such interfaces for connecting with optical cables at the TAP and link ports.

The TAPs of the invention can be discrete components that can be removably connected to a pluggable optical transceiver module as illustrated above. In other embodiments, the TAPs can be integrated into an optical transceiver module rather than being a separate component, in which case transceiver port 150 may be omitted in certain embodiments. Although the invention is described herein primarily in reference to Small Form Factor Pluggable (SFP) modules, the principles of the invention can also be applied to TAPs that can be used with other communication modules, such as Small Form Factor (SFF) modules, other optoelectronic transceiver modules or other types of transceivers.

Because the TAPs of the invention are relatively small and have only a single port to be accessed by a network analysis device, the TAPs can be relatively inexpensive. Thus, the TAPs of the invention can reasonably permit a network administrator to install TAPs in as many as all of the network links of a network. As network problems are experienced, the network administrator can connect a network analysis device to any of the links that might be useful to analyze.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network TAP that provides access to data communicated in a network, comprising:
   a transceiver port configured to be connected to an optical transceiver module, wherein the transceiver port comprises a first interface for receiving outgoing signals from a transmitter optical subassembly of the optical transceiver module and a second interface for passing incoming signals to a receiver optical subassembly of the optical transceiver module;
   a link port configured to interface with a network link that is in communication with the optical transceiver module, wherein at least one optical path is configured to relay optical signals between the transceiver port and the link port;
   at least one coupler in the optical path for splitting the optical signals such that a portion of the optical signals is directed to a TAP port; and
   the TAP port, wherein the TAP port is configured to relay a portion of the optical signals received at the transceiver port and a portion of the optical signals received at the link port to a connected device, wherein the at least one optical path comprises:
      a first optical conductor for relaying outgoing optical signals from the transmitter optical subassembly to a first optical fiber of the network link; and
      a second optical conductor for relaying incoming optical signals from a second optical fiber of the network link to the receiver optical subassembly; and the at least one coupler comprises:
      a first coupler for splitting off a portion of the outgoing optical signals relayed on the first optical conductor and directing the split portion of the outgoing optical signals to the TAP port, wherein the split portion contains the same data as the outgoing optical signal relayed on the first optical conductor; and
      a second coupler for splitting off a portion of the incoming optical signals relayed on the second optical conductor and directing the split portion of the incoming optical signals to the TAP port, wherein the split portion contains the same data as the incoming optical signal relayed on the second optical conductor.

2. The network TAP as defined in claim 1, wherein the first coupler diverts thirty percent of the optical power of the outgoing optical signals to the TAP port.

3. The network TAP as defined in claim 1, wherein the transceiver port and the link port are compatible with SFP standards.

4. A network TAP that provides access to data communicated in a network, comprising:
   a transceiver port configured to be connected directly to an SFP optical transceiver module, including a first transceiver interface for receiving outgoing signals from a transmitter optical subassembly of the optical transceiver module and a second transceiver interface for passing incoming signals to a receiver optical subassembly of the optical transceiver module;
   a link port that interfaces with a network link that is in communication with the optical transceiver module, including a first link interface for connecting to a first optical cable carrying incoming signals and a second link interface for connecting to a second optical cable carrying outgoing signals;
   a TAP port that is configured for relaying optical signals to a connected device;
   a first optical path between the first transceiver interface and the second link interface;
   a first coupler for splitting the optical signals transmitted on the first optical path such that a split portion of the optical signals are relayed on a third optical path to the TAP port, wherein the split portion relayed on the third optical path is a copy of the optical signals transmitted on the first optical path;
   a second optical path between the second transceiver interface and the first link interface; and
   a second coupler for splitting the optical signals transmitted on the second optical path such that a split portion of the optical signals are relayed on a fourth optical path to the TAP port, wherein the split portion relayed on the fourth optical path is a copy of the optical signals transmitted on the second optical path.

5. The network TAP as defined in claim 4, wherein the optical signals relayed on the third optical path have thirty percent of the optical power of the optical signals entering the first coupler.

6. The network TAP as defined in claim 4, wherein the link port and the TAP port are configured side by side.

7. The network TAP as defined in claim 4, wherein the link port and the TAP port are configured vertically with respect to one another.

8. The network TAP as defined in claim 4, wherein the network TAP is connected to the optical transceiver module in a manner such that the network TAP is an integral component of the optical transceiver module.

* * * * *